US012269049B1

(12) United States Patent
Yan

(10) Patent No.: US 12,269,049 B1
(45) Date of Patent: Apr. 8, 2025

(54) INTEGRATED SHOWER ARM

(71) Applicant: XIAMEN GALENPOO KITCHEN & BATHROOM TECHNOLOGY CO., LTD, Xiamen (CN)

(72) Inventor: Xiaoling Yan, Xiamen (CN)

(73) Assignee: XIAMEN GALENPOO KITCHEN & BATHROOM TECHNOLOGY CO., LTD, Xiamen (CN)

( * ) Notice: Subject to any disclaimer, the term of this patent is extended or adjusted under 35 U.S.C. 154(b) by 0 days.

(21) Appl. No.: 18/949,997

(22) Filed: Nov. 16, 2024

(51) Int. Cl.
*B05B 1/18* (2006.01)
*B05B 15/62* (2018.01)
*B05B 15/654* (2018.01)
*E03C 1/04* (2006.01)

(52) U.S. Cl.
CPC .............. *B05B 1/185* (2013.01); *B05B 15/62* (2018.02); *E03C 1/0409* (2013.01); *B05B 15/654* (2018.02)

(58) Field of Classification Search
CPC ........... B05B 1/18; B05B 1/185; B05B 15/60; B05B 15/62; B05B 15/65; B05B 15/652; B05B 15/654; B05B 15/658; E03C 1/0408; E03C 1/0409; A47K 3/28
See application file for complete search history.

(56) References Cited

U.S. PATENT DOCUMENTS

| | | | | |
|---|---|---|---|---|
| 11,273,456 B2 * | 3/2022 | Zhang | F16K 11/085 | |
| 11,826,769 B2 * | 11/2023 | Lee | B05B 1/18 | |
| 2015/0158047 A1 * | 6/2015 | Johnson | E03C 1/06 | 239/273 |
| 2016/0340876 A1 * | 11/2016 | Lin | E03C 1/0408 | |
| 2022/0213673 A1 * | 7/2022 | He | E03C 1/0409 | |
| 2023/0175240 A1 * | 6/2023 | Yan | E03C 1/0408 | 239/281 |
| 2023/0203795 A1 * | 6/2023 | Huang | E03C 1/0408 | 4/597 |
| 2024/0009688 A1 * | 1/2024 | Clarke | E03C 1/0409 | |

FOREIGN PATENT DOCUMENTS

| | | |
|---|---|---|
| CN | 108787275 A | 11/2018 |
| CN | 221511709 U | 8/2024 |
| CN | 221567340 U | 8/2024 |

* cited by examiner

*Primary Examiner* — Darren W Gorman
(74) *Attorney, Agent, or Firm* — Nitin Kaushik

(57) ABSTRACT

The disclosure discloses an integrated shower arm, including an arm body, a diverter spool and a shower head holder. The arm body is bent. An upper part of the arm body is provided with an overhead shower coupling, a lower part of the arm body is connected to a shower head holder, and a middle part of the arm body is provided with a diverter seat. The diverter seat is provided with a water inlet port and a diverter duct, and a spool body of the diverter spool is rotatably inserted into the diverter duct and controls whether water comes out of the overhead shower coupling or a handheld connecting port. The disclosure is good in integrality and small in size and can be used for holding a shower head.

10 Claims, 5 Drawing Sheets

INTEGRATED SHOWER ARM

TECHNICAL FIELD

The disclosure relates to the field of bathroom accessories, and in particular to an integrated shower arm.

BACKGROUND

The existing overhead shower head is typically connected to a water outlet coupling on the wall through a shower arm. In order to enhance the functions of the shower arm, the existing shower arm is provided with a three-way valve. One outlet of the three-way valve is used to be connected to the overhead shower head, and the other outlet of the three-way valve is used to be connected to the handheld shower head. The arrangement of the three-way valve makes the shower arm large in size and poor in integrality. In addition, the handheld shower head needs an additional shower head holder arranged on the wall to hold it.

In view of the above problems, it is necessary to develop an integrated shower arm which is small in size and can hold the shower head.

SUMMARY

An objective of the disclosure is to provide an integrated shower arm, which is small in size and can hold a shower head.

In order to achieve the above objective, the solution of the disclosure is as follows:

An integrated shower arm includes an arm body, a diverter spool and a shower head holder. The arm body is bent, the arm body includes a shell, a surface cover and a water passing plate, a middle part of one side of the shell is provided with a diverter seat, the other side of the shell is formed with a mounting opening, the surface cover is connected to the shell and covers the mounting opening, the water passing plate is arranged between the shell and the surface cover, the water passing plate is connected to the shell, and a water passage is formed between the water passing plate and the shell; an upper side of the surface cover is fitted with an overhead shower coupling, the overhead shower coupling is in communication with the water passage, and the shower head holder is fixed to a lower side of the surface cover; the diverter seat is provided with a water inlet port and a diverter duct, an inner wall of the diverter duct is provided with a water inlet hole and a water outlet hole opposite to each other, and the water inlet hole and the water outlet hole are respectively in communication with the water inlet port and the water passage; and the diverter spool has a spool body, the spool body is rotatably inserted into the diverter duct and controls communication of the water inlet hole and the water outlet hole, and one end of the spool body is provided with a handheld connecting port in movable communication with the water inlet hole.

The handheld connecting port is in communication with an inner cavity of the spool body, an outer wall of the spool body is provided with a water passing groove, a side wall of the spool body is provided with a water passing through hole in communication with the inner cavity of the spool body, the spool body is fitted with a sealing ring in a sealing fit with the inner wall of the diverter duct, the water passing groove of the spool body is in movable communication with the water inlet hole and the water outlet hole, and a water passing through port of the spool body is in movable communication with the water inlet hole.

The overhead shower coupling and the water passing plate are integrated.

The shower head holder is locked with the surface cover through screws.

The surface cover is provided with a fitting slot surrounding the shower head holder, and a shielding cover covering the screws is embedded in the fitting slot.

The shower head holder includes a holder body and a magnet, the holder body is connected to the surface cover, and the magnet is fitted with the holder body.

The holder body is provided with a holding slot, and the magnet is fitted in the holding slot.

The spool body of the diverter spool is provided with a positioning slot along a circumferential direction of the spool body; and a positioning pin slidably connected to the positioning slot is fitted in the diverter seat, and the positioning pin movably abuts against two sides of the positioning slot.

The diverter spool further includes a handle connected to a side wall of the spool body.

The water inlet port is connected with a universal spherical joint.

By adopting the above solution, the diverter seat is directly formed on the arm body, and the diverter spool is mounted in the diverter seat, so as to realize water diversion and switching. In this way, the integrated shower arm of the disclosure has good integrality, so that the size of the integrated shower arm can be effectively reduced. Thus, the integrated shower arm of the disclosure is small in size. Besides, the shower head holder is arranged on the arm body. The shower head holder can be used for holding the handheld shower head, which is very convenient.

Figure 1:
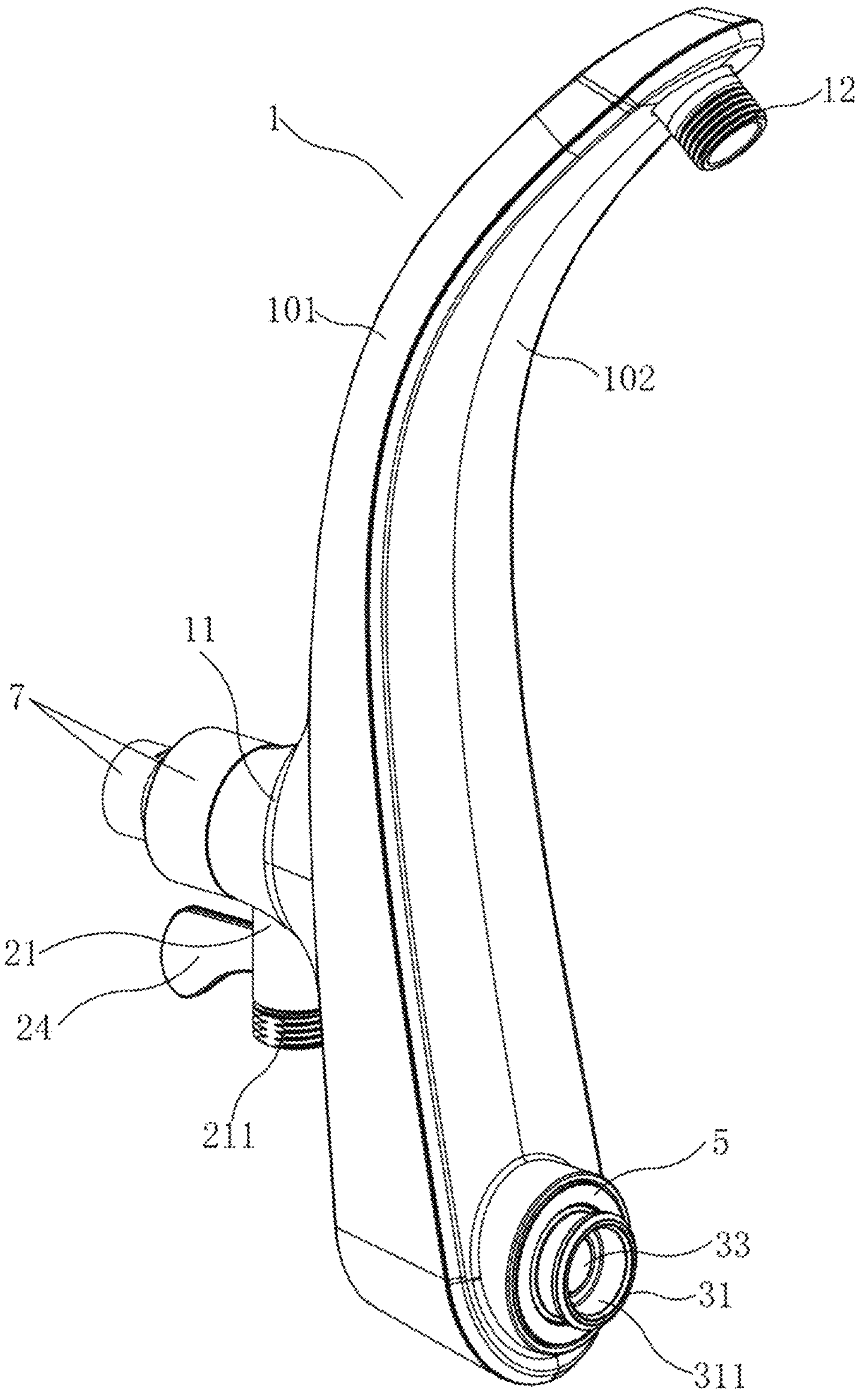
FIG. 1 is a schematic structural view I of the disclosure.

DESCRIPTION OF REFERENCE SIGNS arm body 1, shell 101, surface cover 102, water passing plate 103,
diverter seat 11, water inlet port 111, diverter duct 112, water inlet hole 1121, water outlet hole 1122,
overhead shower coupling 12,
mounting opening 13,
water passage 14,
fitting slot 15,
diverter spool 2,
spool body 21, handheld connecting port 211, water passing groove 212, water passing through hole 213, positioning slot 214,
sealing ring 22, sealing gasket 23, handle 24,
shower head holder 3, holder body 31, holding slot 311, magnet 32, protective cover 33,
screw 4,
shielding cover 5,
positioning pin 6,
universal spherical joint 7.

DETAILED DESCRIPTION OF THE EMBODIMENTS

In order to further explain the technical solution of the disclosure, the disclosure will be described in detail through specific examples.

Figure 2:
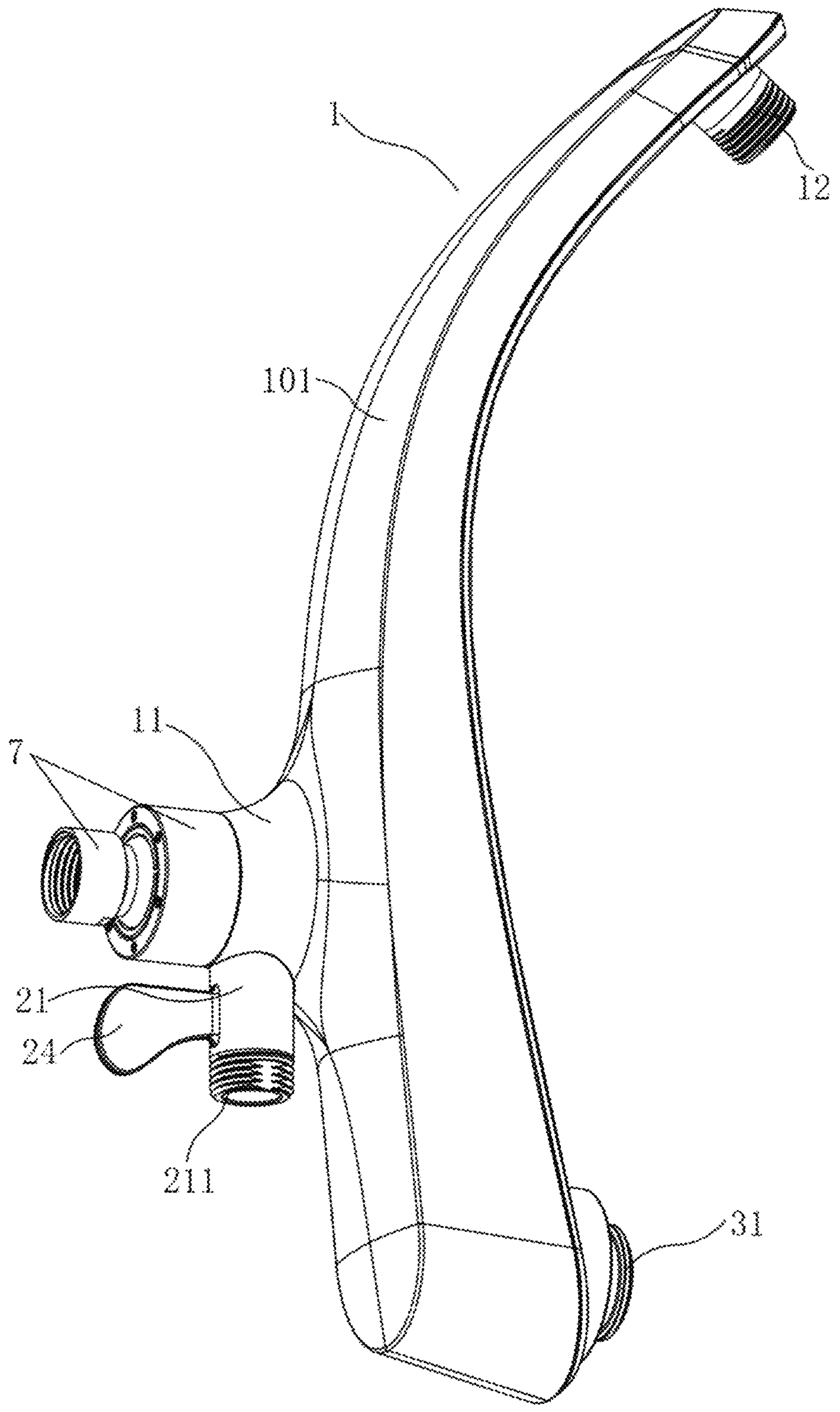
FIG. 2 is a schematic structural view II of the disclosure.
Figure 3:
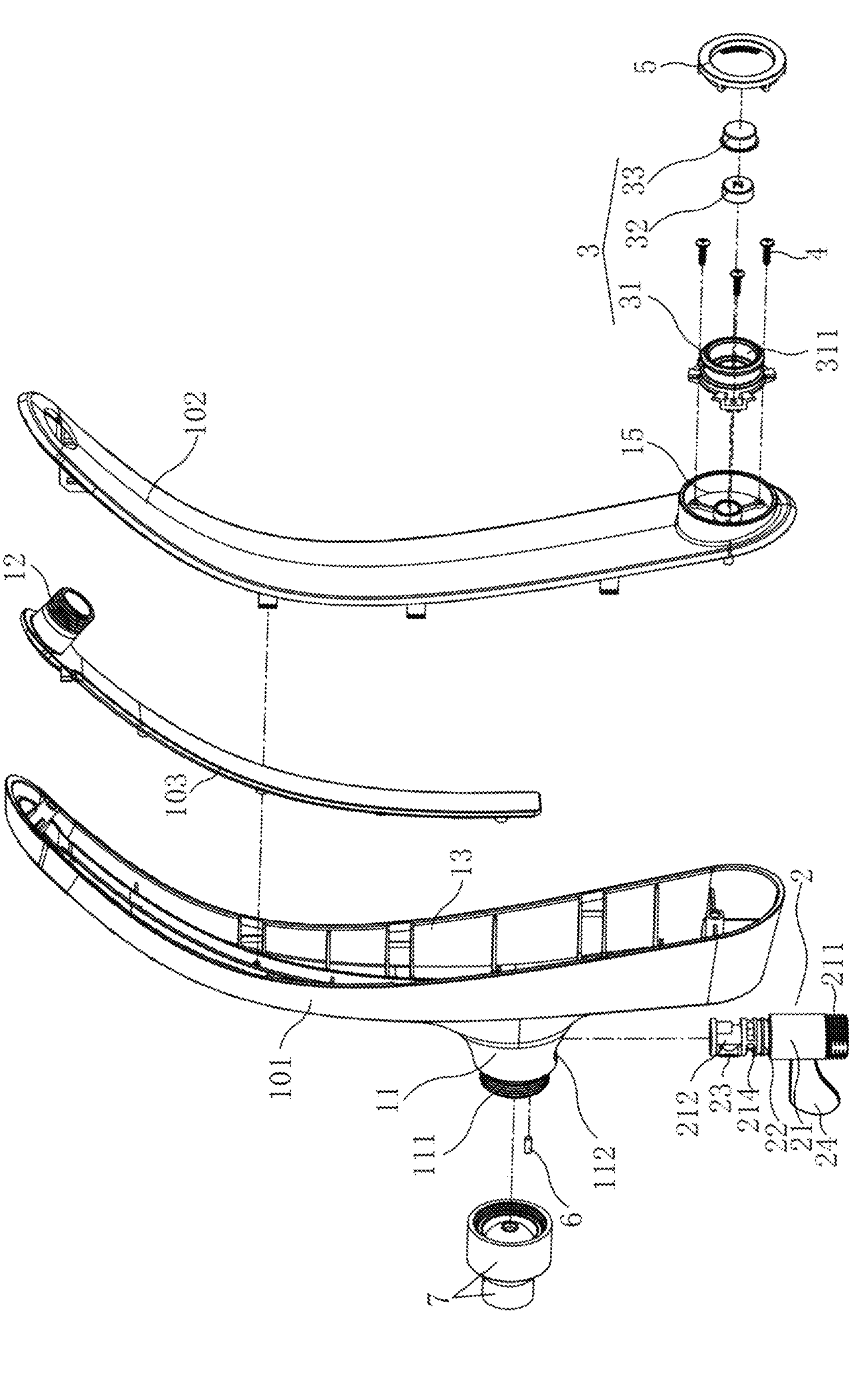
FIG. 3 is a structural exploded view I of the disclosure.
Figure 4:
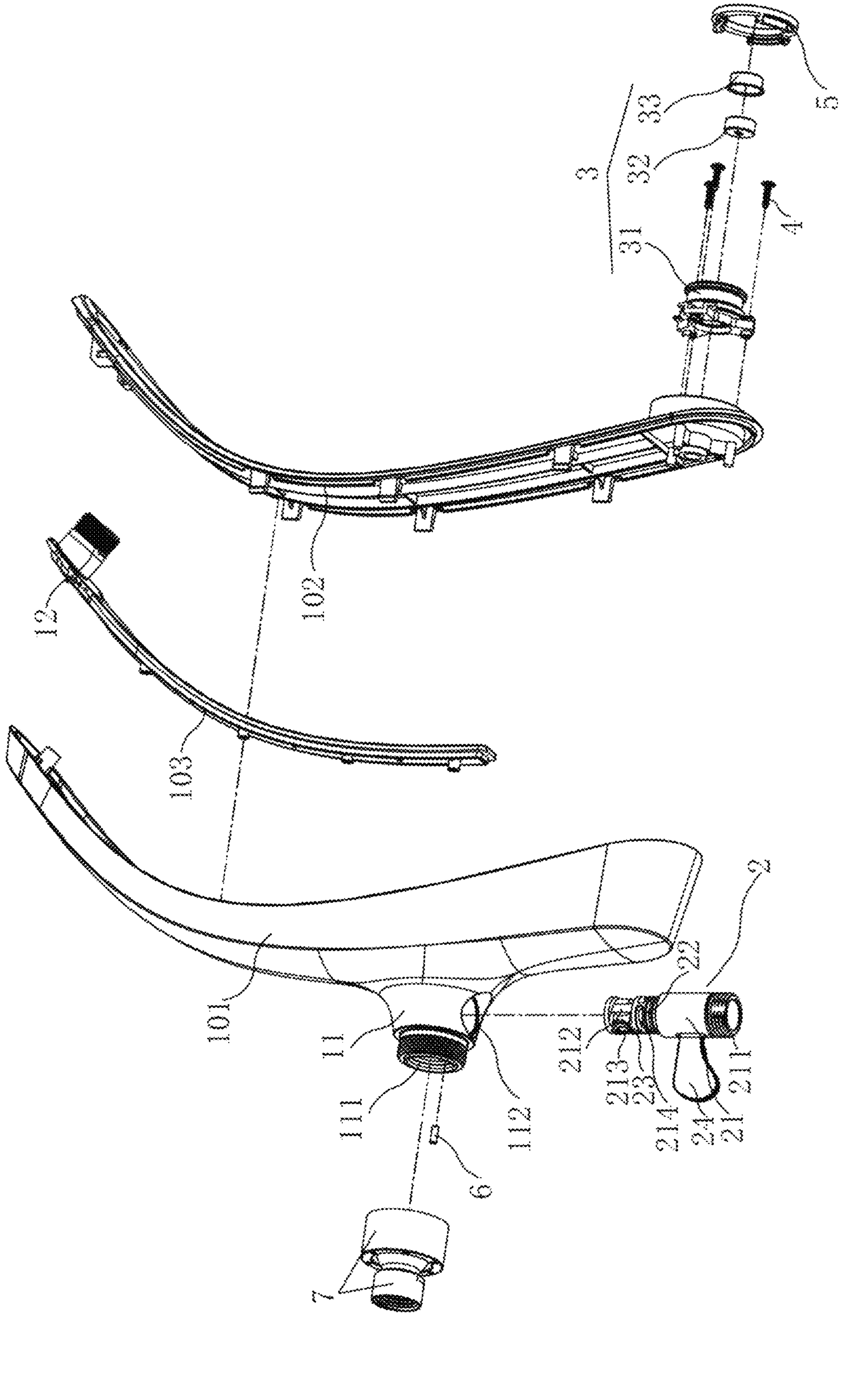
FIG. 4 is a structural exploded view II of the disclosure.
Figure 5:
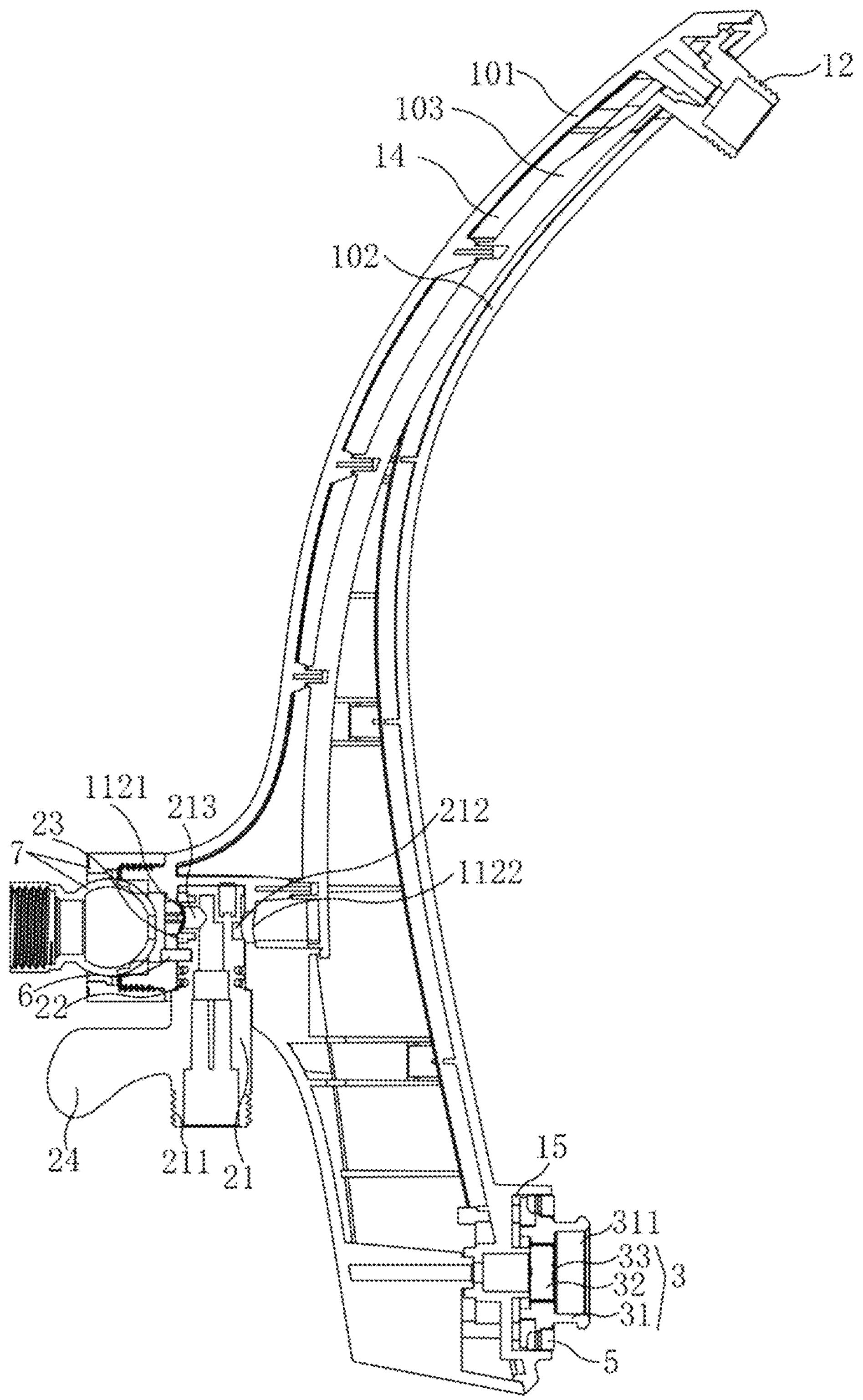
FIG. 5 is a sectional view of the disclosure.

As shown in FIG. 1 to FIG. 5, the disclosure discloses an integrated shower arm, including an arm body 1, a diverter spool 2 and a shower head holder 3. The arm body 1 is bent. The arm body 1 includes a shell 101, a surface cover 102 and a water passing plate 103. A middle part of one side of the shell 101 is provided with a diverter seat 11, and the other side of the shell 101 is formed with a mounting opening 13. The surface cover 102 is connected to the shell 101 and covers the mounting opening 13. The water passing plate 103 is arranged between the shell 101 and the surface cover 102. The water passing plate 103 is connected to the shell 101, and a water passage 14 is formed between the water passing plate 103 and the shell 101. The water passing plate 103 may be connected to the shell 101 by welding. An upper side of the surface cover 102 is fitted with an overhead shower coupling 12, the overhead shower coupling 12 is in communication with the water passage 14, and the water passing plate 103 the overhead shower coupling 12 may be integrally formed. The shower head holder 3 is fixed to a lower side of the surface cover 102. The diverter seat 11 is provided with a water inlet port 111 and a diverter duct 112. An inner wall of the diverter duct 112 is provided with a water inlet hole 1121 and a water outlet hole 1122 opposite to each other, and the water inlet hole 1121 and the water outlet hole 1122 are respectively in communication with the water inlet port 111 and the water passage 14. The diverter spool 2 has a spool body 21. The spool body 21 is rotatably inserted into the diverter duct 112 and controls communication of the water inlet hole 1121 and the water outlet hole 1122, and one end of the spool body 21 is provided with a handheld connecting port 211 in movable communication with the water inlet hole 1121. According to the disclosure, by rotating the spool body 21 of the diverter spool 2, the communication of the handheld connecting port 211 and the overhead shower coupling 12 with the water inlet port 111 can be controlled, thereby realizing water diversion and switching.

Based on the above, by adopting the above solution, the diverter seat 11 is directly formed on the arm body 1, and the diverter spool 2 is mounted in the diverter seat 11, so as to realize water diversion and switching. In this way, the integrated shower arm of the disclosure has good integrality, so that the size of the integrated shower arm can be effectively reduced. Thus, the integrated shower arm of the disclosure is small in size. Besides, the shower head holder 3 is arranged on the arm body 1. The shower head holder 3 can be used for holding the handheld shower head, which is very convenient. In addition, the overhead shower coupling 12 and the shower head holder 3 are located on the same side of the arm body 1, so that people taking a shower can take and put back the handheld shower head conveniently. The diverter seat 11 is located on the other side of the arm body 1, which prevents the diverter seat 11 and the diverter spool 2 from interfering with people's showers.

In an example of the disclosure, the shower head holder 3 includes a holder body 31 and a magnet 32, the holder body 31 is connected to the surface cover 102 of the arm body 1, and the magnet 32 is fitted with the holder body 31. In this way, the shower head holder 3 can be connected with the handheld shower head by magnetic attraction, so that the handheld shower head can be taken and put back conveniently. The holder body 31 of the shower head holder 3 may be locked with the surface cover 102 through screws 4. The surface cover 102 is provided with a fitting slot 15 surrounding the shower head holder 3, and a shielding cover 5 covering the screws 4 is embedded in the fitting slot 15, which prevents the screws 4 from being exposed to the outside. The holder body 31 of the shower head holder 3 may be provided with a holding slot 311, and the magnet 32 is fitted in the holding slot 311. The handheld shower head may have a fitting portion inserted into the holding slot 311, which improves the stability of connection between the handheld shower head and the shower head holder 3. A protective cover 33 for covering the magnet 32 may be fitted in the holding slot 311 so as to protect the magnet 32.

In an example of the disclosure, the handheld connecting port 211 may be in communication with an inner cavity of the spool body 21, an outer wall of the spool body 21 is provided with a water passing groove 212, a side wall of the spool body 21 is provided with a water passing through hole 213 in communication with the inner cavity of the spool body 21, the spool body 21 is rotatably inserted into the diverter duct 112, and the spool body 21 is fitted with a sealing ring 22 in a sealing fit with the inner wall of the diverter duct 112, which can avoid water leakage. The water passing groove 212 of the spool body 21 is in movable communication with the water inlet hole 1121 and the water outlet hole 1122, and a water passing through port of the spool body 21 is in movable communication with the water inlet hole 1121. When the spool body 21 of the diverter spool 2 is rotated until only the water passing through port of the spool body 21 is in communication with the water inlet hole 1121, the water inlet port 111 is in communication with the handheld connecting port 211 through the water passing through port, and water comes out of the handheld connecting port 211 such that water comes out of the handheld shower head connected with the handheld connecting port 211. When the spool body 21 of the diverter spool 2 is rotated until only the water passing groove 212 is in communication with the water inlet hole 1121 and the water passing groove 212 is in communication with the water outlet hole 1122, the water inlet port 111 is in communication with the overhead shower coupling 12 through the water passing groove 212 and the water outlet hole 1122, and water comes out of the overhead shower coupling 12 such that water comes out of the overhead shower head connected with the overhead shower coupling 12.

In an example of the disclosure, the spool body 21 of the diverter spool 2 is provided with a positioning slot 214 along a circumferential direction of the spool body 21, a positioning pin 6 slidably connected to the positioning slot 214 is fitted in the diverter seat 11, the positioning pin 6 movably abuts against two sides of the positioning slot 214, and the positioning pin 6 may be mounted from the water inlet port 111 and inserted into a body of the diverter seat 11. Through the positioning fit between the positioning pin 6 and the positioning slot 214, the disclosure can be switched between two water path states accurately and quickly, which is convenient to use. The two water path states are as follows: the water passing through port of the spool body 21 is in communication with the water inlet hole 1121, and the water passing groove 212 is in communication with the water inlet hole 1121 and the water outlet hole 1122. Besides, the water passing through port of the spool body 21 may be fitted with a sealing gasket 23 in a sealing fit with the inner wall of the diverter duct 112, which can avoid interflowing of the water paths.

In an example of the disclosure, the diverter spool 2 may further include a handle 24 connected to a side wall of the spool body 21, which facilitates the rotation of the diverter spool 2.

In an example of the disclosure, the water inlet port 111 is connected with a universal spherical joint 7, so that the angle of the arm body 1 can be adjusted flexibly, which is convenient to use.

The above examples and drawings do not limit the product form and style of the disclosure, and any appropriate changes or modifications made by those of ordinary skill in the art shall be regarded as not departing from the patent scope of the disclosure.

What is claimed is:

1. An integrated shower arm, comprising an arm body, a diverter spool and a shower head holder; wherein the arm body is bent, the arm body comprises a shell, a surface cover and a water passing plate, a middle part of one side of the shell is provided with a diverter seat, the other side of the shell is formed with a mounting opening, the surface cover is connected to the shell and covers the mounting opening, the water passing plate is arranged between the shell and the surface cover, the water passing plate is connected to the shell, and a water passage is formed between the water passing plate and the shell; an upper side of the surface cover is fitted with an overhead shower coupling, the overhead shower coupling is in communication with the water passage, and the shower head holder is fixed to a lower side of the surface cover; the diverter seat is provided with a water inlet port and a diverter duct, an inner wall of the diverter duct is provided with a water inlet hole and a water outlet hole opposite to each other, and the water inlet hole and the water outlet hole are respectively in communication with the water inlet port and the water passage; and the diverter spool has a spool body, the spool body is rotatably inserted into the diverter duct and controls communication of the water inlet hole and the water outlet hole, and one end of the spool body is provided with a handheld connecting port in movable communication with the water inlet hole.

2. The integrated shower arm according to claim 1, wherein the handheld connecting port is in communication with an inner cavity of the spool body, an outer wall of the spool body is provided with a water passing groove, a side wall of the spool body is provided with a water passing through hole in communication with the inner cavity of the spool body, the spool body is fitted with a sealing ring in a sealing fit with the inner wall of the diverter duct, the water passing groove of the spool body is in movable communication with the water inlet hole and the water outlet hole, and a water passing through port of the spool body is in movable communication with the water inlet hole.

3. The integrated shower arm according to claim 1, wherein the overhead shower coupling and the water passing plate are integrated.

4. The integrated shower arm according to claim 1, wherein the shower head holder is locked with the surface cover through screws.

5. The integrated shower arm according to claim 4, wherein the surface cover is provided with a fitting slot surrounding the shower head holder, and a shielding cover covering the screws is embedded in the fitting slot.

6. The integrated shower arm according to claim 1, wherein the shower head holder comprises a holder body and a magnet, the holder body is connected to the surface cover, and the magnet is fitted with the holder body.

7. The integrated shower arm according to claim 6, wherein the holder body is provided with a holding slot, and the magnet is fitted in the holding slot.

8. The integrated shower arm according to claim 1, wherein the spool body of the diverter spool is provided with a positioning slot along a circumferential direction of the spool body; and a positioning pin slidably connected to the positioning slot is fitted in the diverter seat, and the positioning pin movably abuts against two sides of the positioning slot.

9. The integrated shower arm according to claim 1, wherein the diverter spool further comprises a handle connected to a side wall of the spool body.

10. The integrated shower arm according to claim 1, wherein the water inlet port is connected with a universal spherical joint.

* * * * *